United States Patent [19]
Yovanovich

[11] 3,774,307
[45] Nov. 27, 1973

[54] GAUGE

[76] Inventor: Joseph T. Yovanovich, 1415 Orchard Way, Rosemont, Pa. 19010

[22] Filed: Mar. 24, 1972

[21] Appl. No.: 237,651

[52] U.S. Cl. ............................ 33/1 SB, 33/92, 35/34
[51] Int. Cl. ................................................ G06g 1/00
[58] Field of Search ................... 33/1 SB, 1 SD, 97, 33/98, 92, 93, 94, 99, 100, 101, 102, 103, 104; 235/61 GM; 35/34

[56] References Cited
UNITED STATES PATENTS
796,030   8/1905   Baumgartner ......................... 33/92
1,965,017   7/1934   Wellington ............................ 33/97

Primary Examiner—Robert B. Hull
Assistant Examiner—Richard R. Stearns
Attorney—Louis V. Schiavo

[57] ABSTRACT

A base member mounts a bar selectively positionable thereon. The bar and sides of the base member normal to each other conjointly form a right triangle. The base member also mounts means for determining certain functions of the right triangle which depend upon the selected position of the bar member.

8 Claims, 7 Drawing Figures

Patented Nov. 27, 1973
3,774,307
2 Sheets-Sheet 1
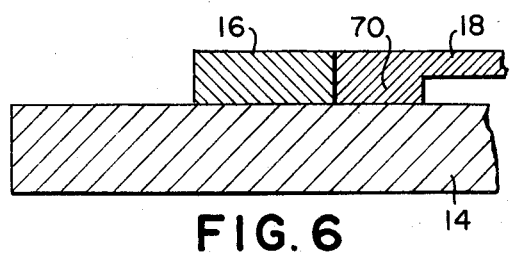
FIG. 6
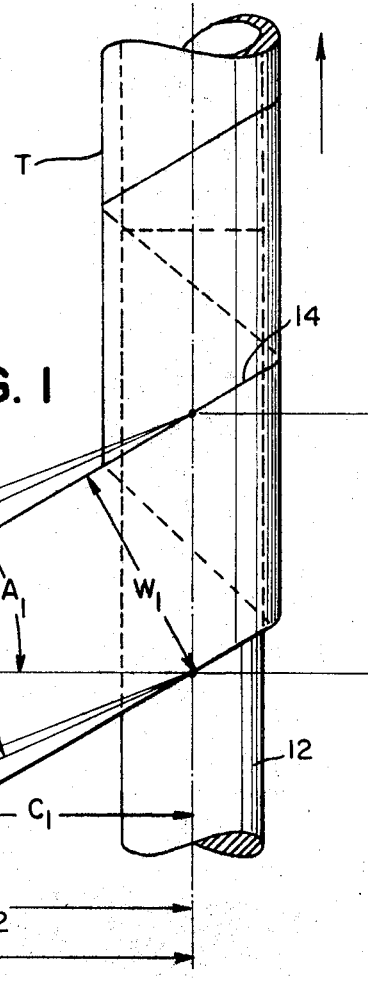
FIG. 1
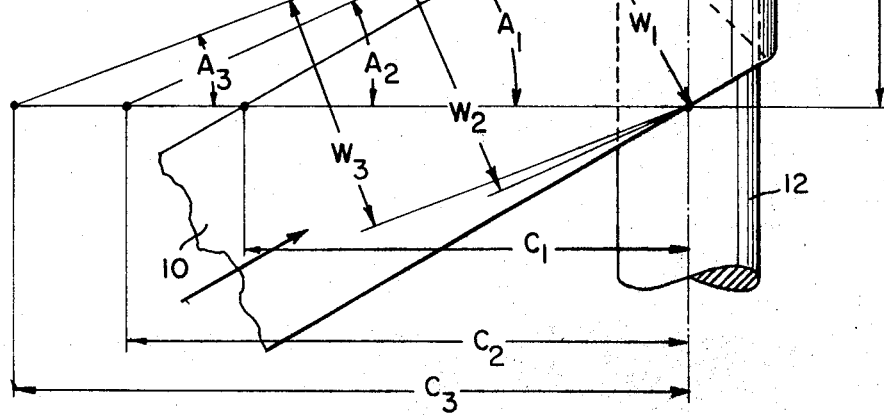
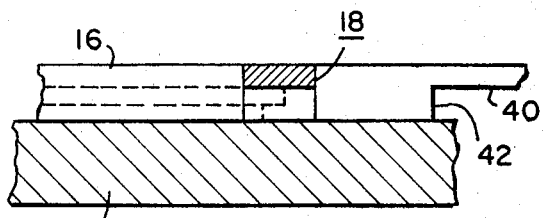
FIG. 7

Patented Nov. 27, 1973
3,774,307
2 Sheets-Sheet 2
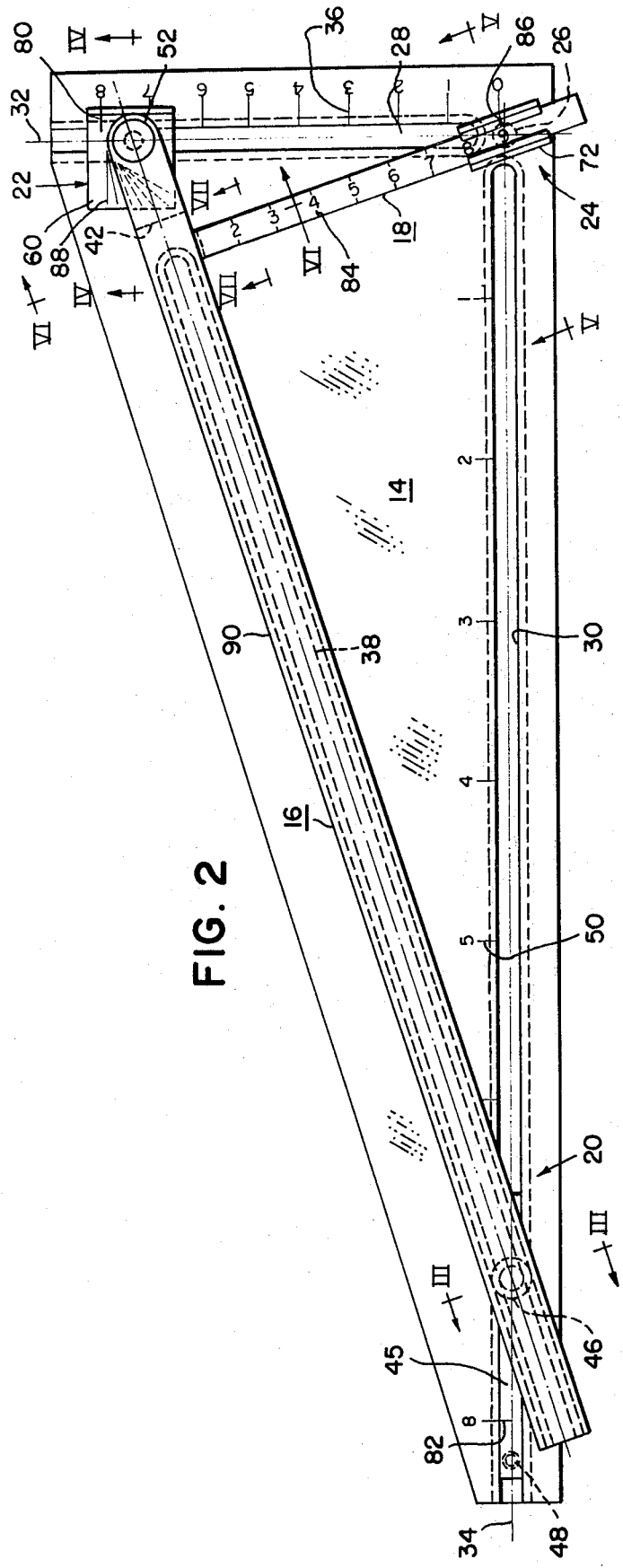
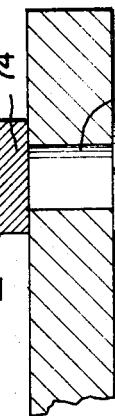
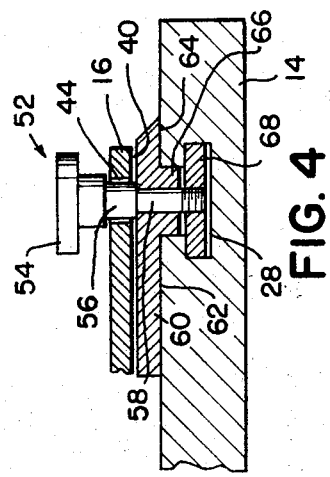
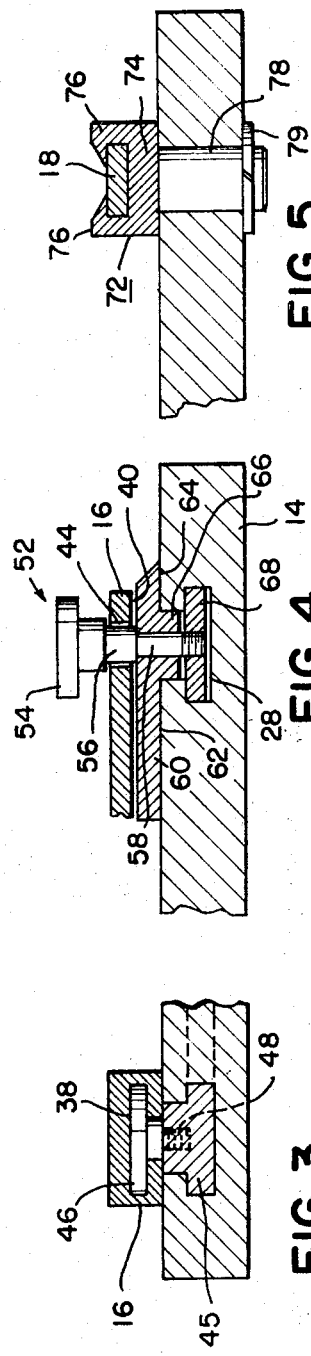

GAUGE

BACKGROUND OF THE INVENTION

1. Field of the Invention

This invention relates to an instrument for determining the widths of the several webs to be used in fabricating a spirally wound paper tube, and for determining the angles at which the several webs are to be fed to the mandrel upon which the tube is formed.

2. Description of the Prior Art

In the fabrication of a spirally wound tubular body the several webs wound successively each about another must vary in width from ply to ply if the gaps which would otherwise develop between convolutions of the webs are to be avoided. The web widths required to make the spiral seams tight may be calculated mathematically. However, since some spirally wound tubular bodies may involve as many as fifteen or more webs, the necessity for this exercise is best avoided for it is time consuming.

SUMMARY OF THE INVENTION

An important object of the present invention is to provide an instrument which facilitates determination of the widths of the several webs to be used in fabricating a spirally wound paper tube with tight spiral seams.

Another object of the present invention is to provide such an instrument which also facilitates determination of the angles at which the several webs are required to be fed to the mandrel to form such a tube.

Still another object of the invention is to provide such an instrument from which a web width and the angle at which the web is to be fed to the mandrel may be had by direct readings after setting the instrument to reflect the circumference of the particular ply into which the web is to be wound, and to reflect the "lead" to be used in forming the tube.

BRIEF DESCRIPTION OF THE DRAWINGS

FIG. 1 is a view showing a web in the process of being spirally wound on a mandrel;

FIG. 2 is a plan view of an instrument constructed in accordance with the present invention; and FIGS. 3 to 7 are enlarged sections on lines III—III to VII—VII in FIG. 2.

DESCRIPTION OF THE PREFERRED EMBODIMENT

The following description is directed to the specific embodiment of the invention disclosed in the drawings. It is not addressed to the scope of the invention, which may be practiced in a variety of forms.

Referring particularly to FIG. 1, the art of winding a multiplicity of paper webs successively each about another to form spirally wound tubular bodies is well known. Referring to FIG. 1, a web 10 is shown in the process of being spirally wound about a mandrel 12 in well known manner to form the first or innermost ply or layer of such a tubular body.

The width of the web, designated $W_1$, and the angle at which the web is fed to the mandrel, designated $A_1$, determine the lead or pitch L of the web, i.e., the distance the tubular body, designated T, advances each time it makes a full turn about the mandrel. To form a desirably tight spiral seam 14, the web feed angle $A_1$ is selected such that the distance designated $C_1$ equals the circumference of the mandrel.

The lead L remains constant throughout the formation of the tubular body. However, each successive web is formed into a ply with a larger diameter and consequently a greater circumference. For example, the second web is formed into a ply with a circumference $C_2$, and the third web is formed into a ply with a circumference $C_3$, etc. Accordingly, as understood by those skilled in the art, if the spiral seams of the several webs are to be tight, the widths of the webs must vary and the angles at which the webs are fed to the mandrel must vary from ply to ply. The second web, with a circumference $C_2$, must have a width $W_2$ and must be fed to the mandrel at an angle $A_2$, and the third web, with a circumference $C_3$ must have a width $W_3$ and must be fed to the mandrel at an angle $A_3$.

The instrument of the present invention provides means for determining the widths of the several webs and the angles at which they should be fed to the mandrel without laboriously going through a long exercise in mathematics.

Referring particularly to FIG. 2, an instrument constructed in accordance with the present invention comprises a base member 14 which carries a principal bar member 16 and gauge means 18. The opposite end portions of the bar 16 are pivotally connected to the base 14 by means respectively designated 20 and 22. The gauge 18 is pivotally connected to the base 14 by means designated 24.

The base 14 preferably is a flat board generally in the shape of a right triangle. The base is provided with a hole 26 in the right angle corner thereof, and extending from edges of the base remote from the hole toward the hole are a pair of grooves or guideways respectively designated 28 and 30. The longitudinally extending centerlines of the grooves, respectively designated 32 and 34, pass through the center of the hole and are disposed normal to each other, as shown. Each groove is of inverted T-shape. Extending along one edge of the groove 28 are graduations affording a scale 36, and extending along one edge of the groove 30 are graduations affording a scale 50.

The bar 16 is generally rectangular in transverse section, and a T-shaped groove 38 in the undersurface thereof extends longitudinally of the bar from the end thereof proximate the groove 30. The end of the bar proximate the groove 28 is reduced in thickness by an undercut 40 affording a shoulder 42 and is provided with a hole 44.

The end of the bar 16 proximate the groove 30 is connected to the base 14 by means 20 comprising a connection bar 45 of inverted T-shape slidable in the groove 30 and mounting a pivot element 46 slidable in the groove 38. A screw 48 is threaded through the bar for releasably securing the same against movement. The distance from the center of the hole 26 to the central axis of the pivot element reflects the circumference of the ply into which the web is to be wound. The instrument may be set to a given circumference by using the scale 50.

The end of the bar 16 proximate the groove 28 is connected to the base 14 by means 22 including a screw 52 provided with a head 54. The shank of the screw is provided with an intermediate section 56 which is reduced in diameter, and which extends freely through the hole 44 in the end of the bar 16. The length of the section 56 is slightly greater than the thickness of the bar 16 so that the bar pivots freely thereabout.

The lower end part 58 of the shank is reduced still further in diameter and extends freely through a connection plate 60 which is undercut, as at 62 and 64, to form a stem 66 slidable in the narrower part of the groove 28, as shown. The lower terminal portion of the shank is threaded into a connection bar 68 which underlies the plate 60, and which is slidable in the wider part of the groove 28. The depth of the stem 66 is slightly less than the depth of the narrower part of the groove 28 so that when the screw is threaded home into the bar 68 the connection 22 is secured against movement. The distance from the center of the hole 26 to the central axis of the screw 52 reflects the lead or pitch of the web. The instrument may be set to a given lead by using the scale 36.

The gauge member 18 is a bar rectangular in transverse section and provided with an inner end portion, adjacent the bar 16, thickened, as at 70. The opposite end portion of the gauge is slidably embraced by a retainer piece 72. The retainer piece is C-shaped in transverse section, being provided with a base wall 74 underlying the gauge and flanges 76 extending about the opposite side narrow edges of the gauge. Depending from the wall 74 is a pin 78 which extends freely through the hole 26 and mounts a split lock element 79 on the lower terminal portion thereof for securing the retainer piece 72 in position.

The outside diameter of the mandrel and the width of the web to be used in forming the first or innermost ply of the tube are known initially. The instrument is then set to reflect the circumference of the mandrel. The screw 52 is threaded out slightly to release the connection 22, and the screw 48 is threaded out slightly to release the connection 20. The connection 20 is then moved to a selected position along the groove 30 using the scale 50 and an index mark 82 on the bar 45. Then the screw 48 is retightened. For convenience in reading the scale 50 the same is offset relative to the hole 26 and the axis of the pivot element 46. In addition, since the circumference of a circle is directly proportional to the diameter, the scale is graduated so as to reflect the circumference of a circle expressed in terms of its diameter, thus avoiding any necessity for calculating the circumference.

Now the instrument is set to reflect the width of the web. The gauge 18, which is graduated to provide a scale 84, is moved to a selected position relative to the retainer piece 72 using the scale 84 and an index mark 86 on one of the flanges 76 of the retainer piece. With the gauge 18 in the required position thereof relative to the retainer piece, it is pivoted about the axis of the pin 78 to a position wherein the end thereof remote from the retainer piece squarely abuts the side of the bar 16. Thus the bar 16 and the gauge 18 are disposed normal to each other. Simultaneously, of course, the bar 16 slides on the element 46 and pivots about the axis thereof. Furthermore, the bar 16 pivots about the axis of the screw 52, and the connection 22 is moved as required along the groove 28. Then the screw 52 is retightened. The plate 60 is provided with a beveled edge bearing an index mark 80 affording means by which the scale 36 may be read to obtain the lead. For convenience in reading the scale, the same is offset relative to the hole 26 and the axis of the screw 52, as shown. The plate 60 is also provided with graduations affording a gauge 88, which may be read by using edge 90 of the bar 16 as an index. The reading gives the angle at which the web should be fed to the mandrel in order to produce a spiral seam that is tight. Now the width of the web which is to be used in forming the second ply and the angle at which the web is to be fed to the mandrel may be determined.

The lead does not change, and accordingly the connection 22 remains in the position thereof already determined. Having measured the outside diameter of the first ply, which, of course, is the inside diameter of the second ply, the instrument is set to reflect the circumference of the second ply. The screw 48 is threaded out slightly to release the connection 20, which is then moved to the required position along the groove 30. Then the screw 48 is retightened. Simultaneously, the bar 16 slides on the element 46 and pivots about the axis of the element 46 and the axis of the screw 52, as required.

The gauge 18 is now manipulated as required to position it normal to the bar 16 and with its end abutting the bar 16. Then the scale 84 is read to obtain the required web width. The angle at which this second web should be fed to the mandrel may be had by the new reading on scale 88.

The same procedure as outlined in the next two preceding paragraphs is followed in determining subsequent web widths and web feed angles.

While in accordance with the provisions of the patent statutes, I have illustrated and described the best form or embodiment of my invention now known to me, it will be apparent to those skilled in the art that changes may be made in the form of the instrument described without departing from the spirit and scope of the invention.

What is claimed is:

1. The combination comprising
   A. a horizontally disposed base provided with a pair of elongated guideways,
   B. a pair of shiftable members mounted upon said base and respectively associated with said guideways for being shifted back and forth therealong and for being releasably secured in a selected position,
   C. a pair of elements respectively mounted upon said shiftable members for movement therewith,
   D. an elongated principal bar extending across said base and secured thereto by longitudinally spaced portions thereof pivotally attached respectively to said elements, said guideways being disposed with their longitudinally extending axes disposed at right angles to each other, and said pivot elements being disposed each at the point of intersection of the longitudinally extending axis of the associated guideway with the longitudinally extending axis of said principal bar, and
   E. means operable for indicating the distance along a perpendicular dropped from the selected position of said principal bar to the point of intersection of the longitudinal axes of said guideways including
      1. an elongated gauge bar extending over said base and disposed at right angles to said principal bar with one end portion thereof abutting the side of said principal bar,
      2. means mounting said gauge bar on said base for pivoting thereof about an axis extending through said point of intersection of the longitudinally extending axes of said guideways, and for being shifted longitudinally relative to said point of intersection of the longitudinally extending axes of said guideways, and 3. graduations along the length of said gauge bar affording a scale coacting with said gauge mounting means for indicating the distance from said longitudinal axis of said principal bar to said point of intersection of the longitudinal axes of said guideways.

2. The combination according to claim 1 wherein the base is provided with graduations affording a pair of scales respectively extending along the length of the guideways and each coacting with index means on the associated member shiftable along the guideway for indicating the distance from the axis of the pivot element mounted upon said shiftable member to the pivotal axis of the means mounting the gauge bar on said base.

3. The combination according to claim 2 wherein at least one of the pivot elements by which the principal bar is secured to the base is freely shiftable longitudinally of said bar.

4. The combination according to claim 3 wherein the guideways are provided by grooves formed in the base, and the shiftable members are slidably received respectively by said grooves.

5. The combination according to claim 4 wherein one of the grooves provided in the base is of inverted T-shape, the associated member shiftable along said groove includes a connection bar slidable in said groove, and a connection plate seated on the top of said groove, and a connection plate seated on the top of said base with a stem part extending downwardly into and slidable in said groove, and the associated pivot element interconnects said connection bar and plate and includes means for releasably clamping the connection plate to the marginal areas of said base defining the opening into said groove.

6. The combination according to claim 5 wherein an upper end portion of the pivot element interconnecting the connection bar and plate extends above said connection plate, and the associated end of the principal bar extends over said connection plate and is connected to said upper end portion of the pivot element for pivotal movement of the principal bar thereabout.

7. The combination according to claim 6 wherein the end of the principal bar which extends over the connection plate coacts with graduations on said connection plate spaced angularly about the axis of the associated pivot element whereby to indicate the angle at which said principal bar is disposed relative to the longitudinally extending axis of the associated groove.

8. The combination according to claim 7 wherein the other one of the grooves provided in the base is of inverted T-shape, the associated member shiftable along said groove includes a connection bar slidable in said groove, the associated pivot element extends upwardly from said connection bar, being provided with a large diameter head and a reduced diameter shank under said head, and the principal bar is provided with a longitudinally extending T-shaped groove in the underside thereof the wider part of which slidably accommodates the head of said pivot element and the narrower part of which slidably accommodates the shank of said pivot element, said principal bar and pivot element thereby being relatively shiftable freely longitudinally of said principal bar in response to movement of either pivot element along the associated one of the grooves provided in said base.

* * * * *